United States Patent [19]

Yamagiwa et al.

[11] 4,268,874

[45] May 19, 1981

[54] TRANSDUCER DEFLECTION APPARATUS FOR USE IN A VIDEO SIGNAL REPRODUCING DEVICE

[75] Inventors: Kazuo Yamagiwa; Masatoshi Kamakur, both of Tokyo; Toshihiko Numakura, Kamakura, all of Japan

[73] Assignee: Sony Corporation, Tokyo, Japan

[21] Appl. No.: 16,924

[22] Filed: Mar. 2, 1979

[30] Foreign Application Priority Data

Mar. 6, 1978 [JP] Japan ................................ 53-25136

[51] Int. Cl.³ ...................... H04N 5/78; G11B 21/10; G11B 21/18
[52] U.S. Cl. ...................................... 360/10; 360/36; 360/77
[58] Field of Search ...................... 360/10, 11, 36, 70, 360/76, 77; 358/8

[56] References Cited

U.S. PATENT DOCUMENTS

| | | | |
|---|---|---|---|
| 3,526,726 | 9/1970 | Corbett et al. | 360/76 |
| 3,787,616 | 1/1974 | Falk et al. | 360/36 |
| 4,167,762 | 9/1979 | Hashizaki et al. | 360/77 |

*Primary Examiner*—James W. Moffitt
*Assistant Examiner*—Donald McElheny, Jr.
*Attorney, Agent, or Firm*—Lewis H. Eslinger; Alvin Sinderbrand

[57] ABSTRACT

An apparatus for reproducing a video signal recorded in skewed parallel tracks on a magnetic tape compensates both for cross-track and along-track errors during reproduction at a tape speed different from the tape speed employed during recording by affixing reproducing heads to bi-morph leaves which are skewed with respect to the direction of rotation of a rotating drum to which they are attached. The skew has components in the along-track direction and the across-track direction such that unidirectional motions of the bi-morph leaves simultaneously correct for cross-track and along-track errors.

11 Claims, 11 Drawing Figures

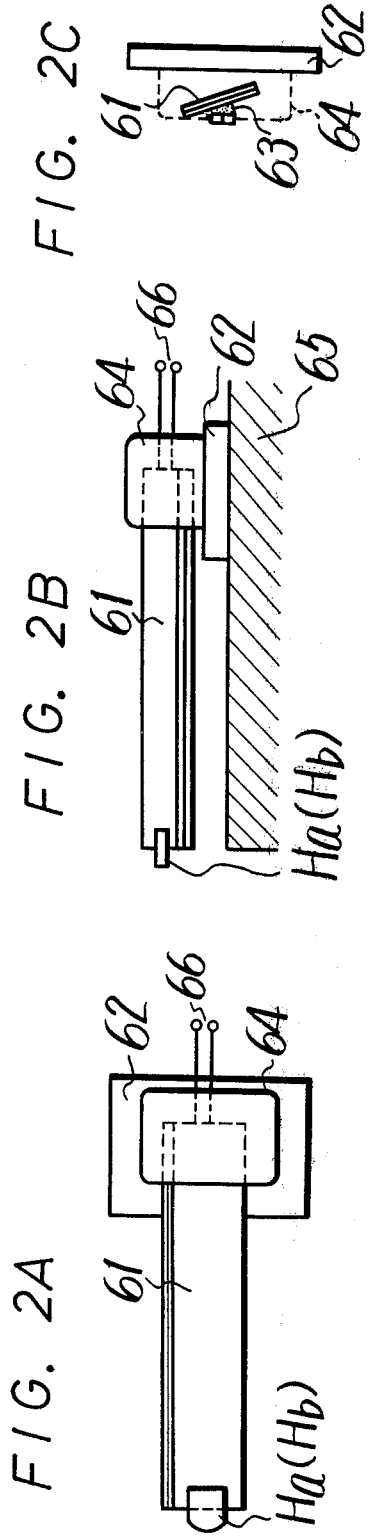
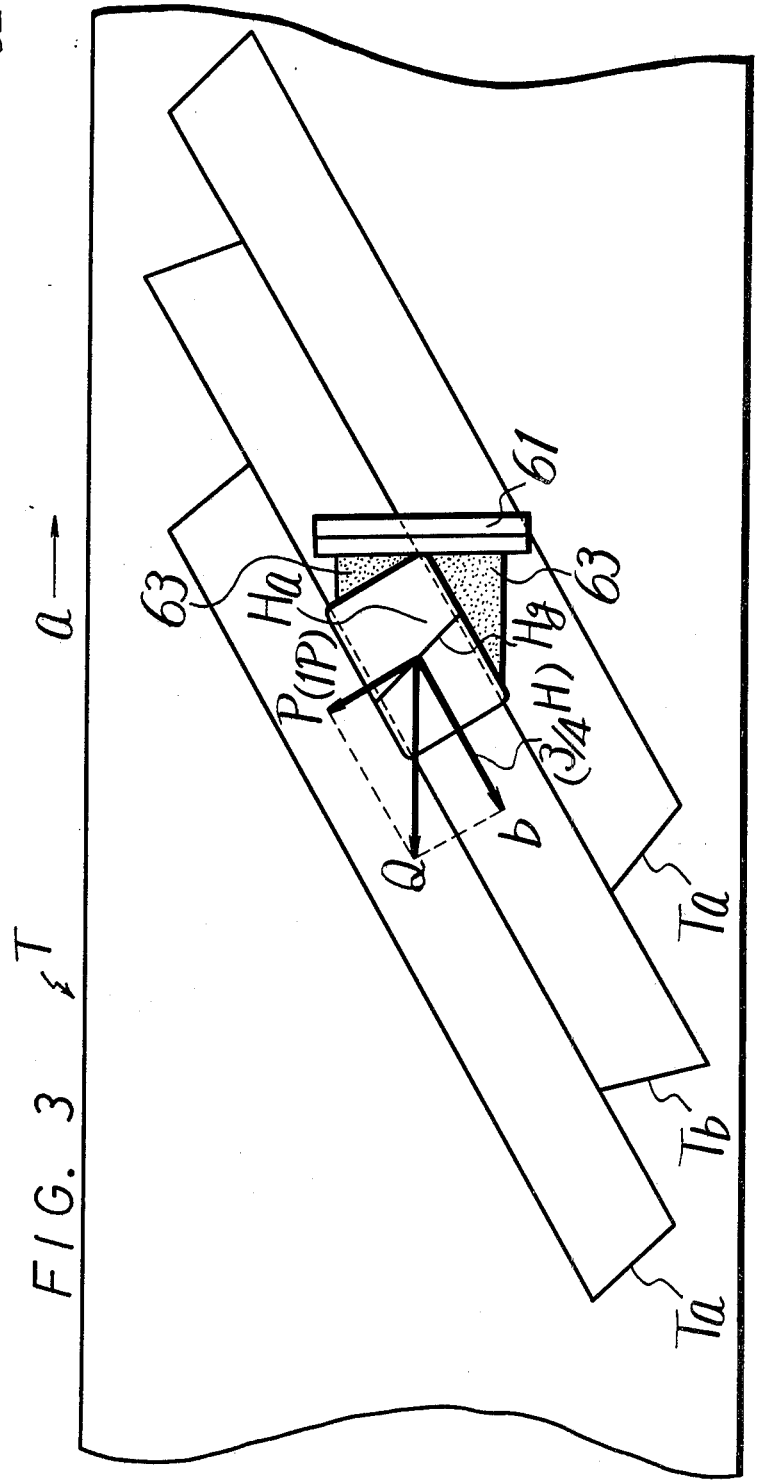

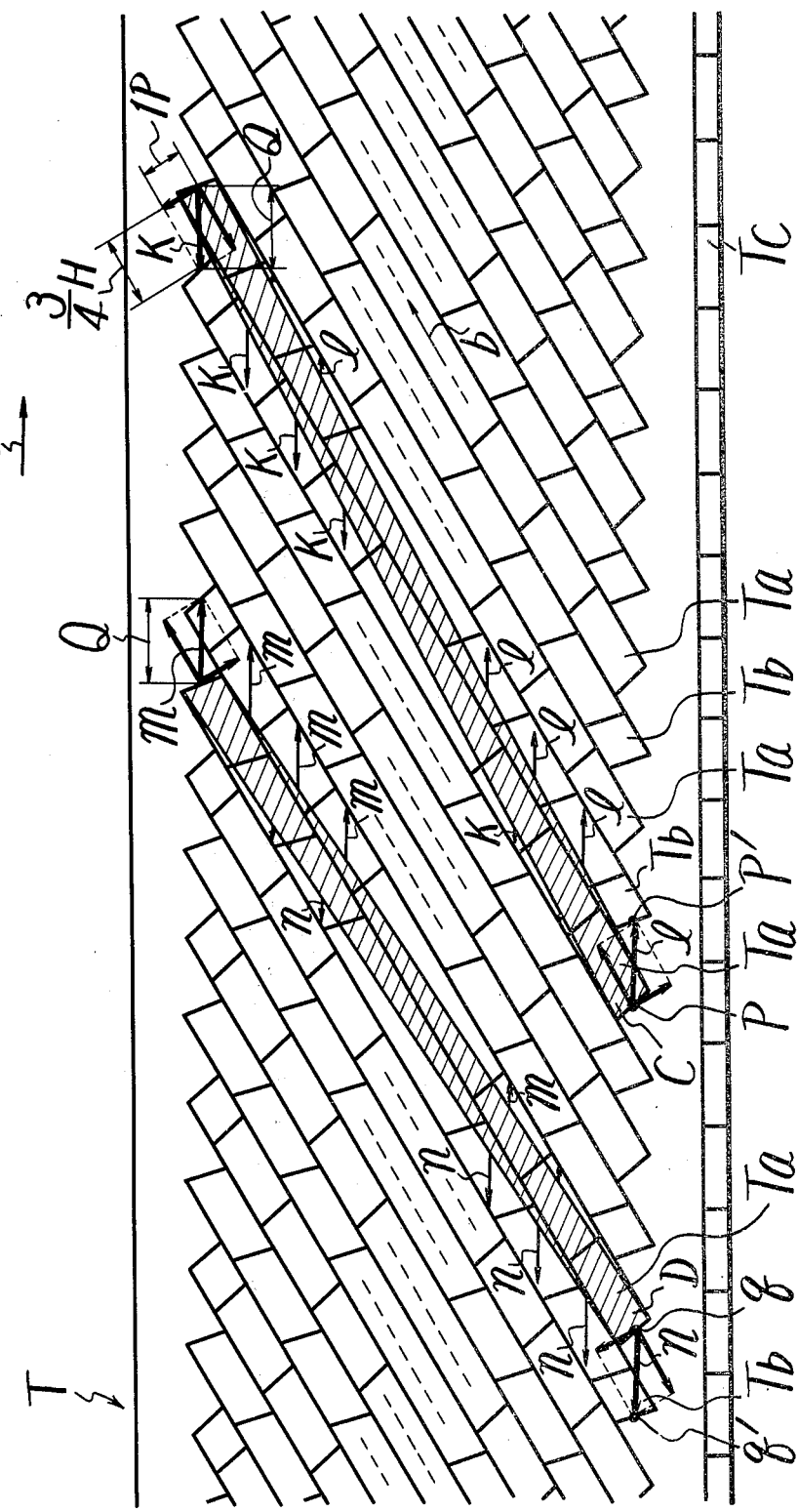

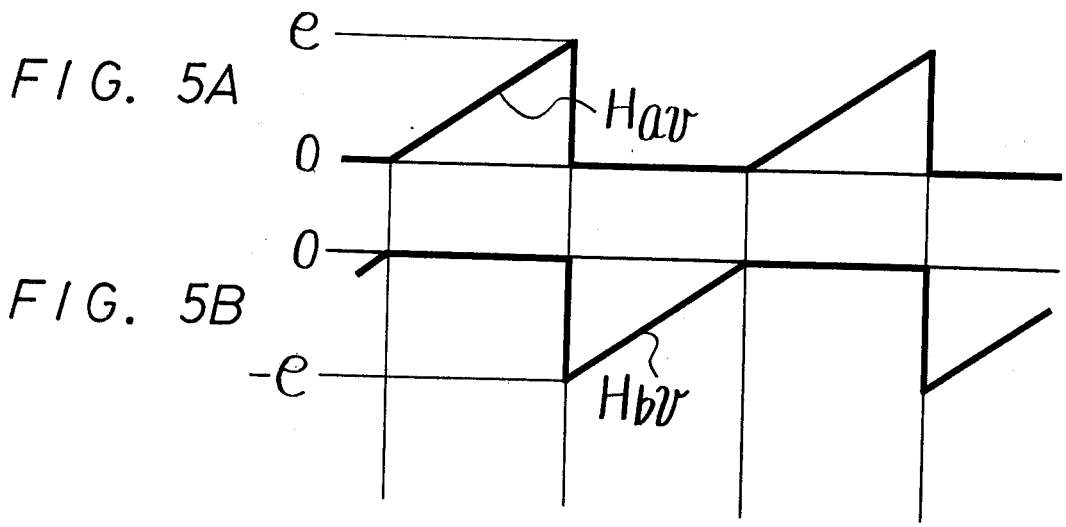
FIG. 5A
FIG. 5B
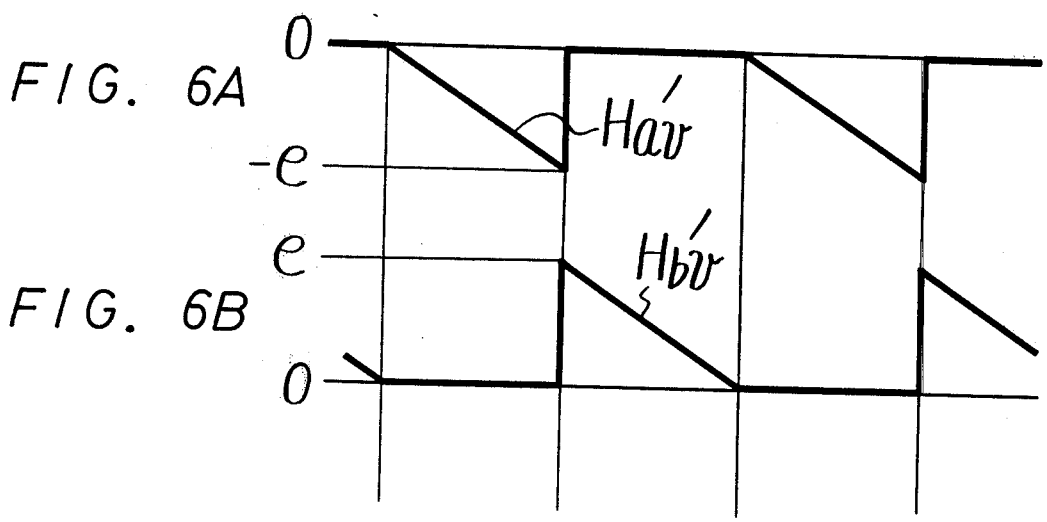
FIG. 6A
FIG. 6B
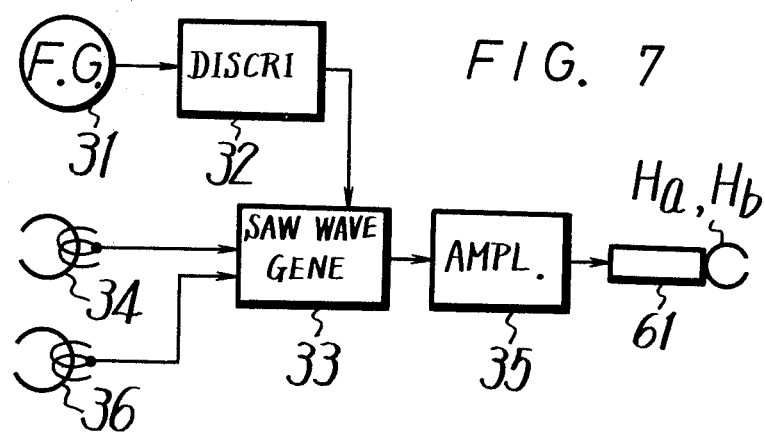
FIG. 7

TRANSDUCER DEFLECTION APPARATUS FOR USE IN A VIDEO SIGNAL REPRODUCING DEVICE

BACKGROUND OF THE INVENTION

1. Field of the Invention

The present invention relates generally to an apparatus for reproducing a video signal recorded in parallel skewed tracks on a magnetic recording medium in a helical scan-type video tape recorder, and is directed more particularly to an apparatus for correcting for errors resulting from a tape transport speed during reproduction which is different from the tape transport speed employed during recording.

2. Description of the Prior Art

The prior art contains examples of attempts to correct mistracking due to reproduction at a different tape transport speed from that used during recording.

In an attempt to increase the recording density, video signals are recorded in adjacent skewed tracks without unrecorded guardbands therebetween. Consequently, if no measures were taken to prevent it, while reproducing a signal in one track, a reproducing head would inevitably reproduce a crosstalk signal from one or both adjacent record tracks. In order to reduce or eliminate such crosstalk which interferes with reproduced signals, the prior art employs first and second recording heads alternately recording in adjacent parallel tracks. The azimuth angles of the recording gaps in the two recording heads are made different so that the magnetic domains created by recording in adjacent tracks are skewed with respect to each other by an angle of suitably 60°–90°. Consequently, when reproduction is performed with first and second reproducing heads having azimuth angles corresponding to the azimuth angles of the first and second recording heads, crosstalk components from adjacent tracks, which have their magnetic domains skewed relative to the azimuth angles of the operative head, are substantially attenuated.

When a video signal recorded on the tape is reproduced at a tape transport speed different from that used during recording, the path of the reproducing heads is additionally influenced by the difference in tape transport speed. The resulting additional skew component causes each reproducing head to follow a path which deviates from the direction along a record track. During still reproduction, for example, the path may begin in coincidence with a first track and end in coincidence with a second adjacent track. Assuming that the recorded azimuth angle of the first track matches the azimuth angle of a first reproducing head, the reproduced signal would begin at full strength during scanning of the first track by the first reproducing head and, as such head passes over to the second adjacent track recorded with a different azimuth angle, the reproduced signal would be substantially attenuated due to azimuth loss. In the case of a system in which a complete television field is recorded on a single track, this would result in the display of a field containing a useful picture only in the upper portion of a screen and would have a poor signal to noise ratio in the lower portion. If the same path were to be followed by the second reproducing head to reproduce a second field interlaced with the first field, the first portion of the track would have a poor signal to noise ratio due to azimuth loss, whereas the later portion of the track would produce a useful signal. Thus, the upper portion of the second field would be degraded but its lower portion would be at full strength. Since both interlaced fields contain significant loss, the quality of the entire picture is seriously degraded.

The above-described problem is addressed in auto-tracking systems in the prior art by mounting the reproducing heads on deflectable members which may be electrically biased or shifted perpendicular to the scanning direction to produce compensating displacement of the reproducing heads which force them to accurately trace the recorded track. The deflectable members may be, for example, bi-morph leaves which are made of, for example, two laminated piezo-ceramic leaves. An example of the use of such a deflectable member is disclosed in, for example, U.S. patent application Ser. No. 731,763 filed Oct. 12, 1976, now abandoned, and assigned to the assignee of the present invention. In such prior art tracking systems for use with skewed tracks recorded on magnetic tape, the reproducing head is moved or vibrated at right angles to the head tracing or scanning direction. This compensates for the additional skew component resulting from the change in tape transport speed. However, an additional error component is produced in the along-track, or time base, direction due to the difference in recording and reproducing speeds. During one scanning period (normally 1/60 of a second), the distance along the tape scanned by a reproducing head during still reproduction is greater than the distance scanned during recording. Therefore, if scanning by the first head is begun on a track at the point where the recorded material commences in such track, the head will scan an unrecorded area on the tape at the end of such track when moved at right angles to the scanning direction for accurate tracking. The second recording head, being similarly moved at right angles to the scanning direction, begins reproducing on unrecorded tape before it reaches the recorded track. This along-track, or time base error is not an integral multiple of a horizontal interval, but instead is a fraction 1/n of a horizontal interval. The resulting disruption in the timing of horizontal synchronizing pulses during reproduction unlocks horizontal synchronization and produces a skew in the reproduced picture.

In the converse case of reproduction at a tape transport speed greater than the tape transport speed during recording, the along-track error is an effective shortening of the scanning path during the scanning period, and again produces disruption in horizontal synchronization and skewing of the picture.

Time base error correction systems have been applied to linear recording devices in the prior art. For example, U.S. Pat. No. 3,787,616, issued Jan. 22, 1974, discloses a time base error correction system for use in a linear magnetic tape recording or playback apparatus and which employs a bi-morph leaf to displace an otherwise stationary recording or playback head in the along-track direction as the tape moves past it according to the coincidence between detected horizontal synchronizing pulses and the output of a reference oscillator.

A time base correction system for linear tape recording is also disclosed in U.S. Pat. No. 3,526,726, issued Sept. 1, 1970. This patent discloses time base error and guide error correction in a linear parallel multiple track tape recorder device. In this disclosure, a multiple parallel track tape is drawn past a substantially stationary record-reproduce head which provides means for sensing and correcting for time displacement between a track and a reference signal as well as for sensing and correcting relative time displacement between tracks of the same tape.

The problems to be solved by the present invention arise when skewed recording tracks are employed and such problems are neither recognized nor addressed in the two above cited prior patents which deal with linear recording apparatus.

OBJECTS AND SUMMARY OF THE INVENTION

An object of this invention is to provide an apparatus for reproducing a video signal which achieves auto-tracking control of a reproducing head which compensates for tracking errors during still, slow, or fast reproduction.

Another object of the present invention is to provide an apparatus for reproducing a video signal which employs a reproducing head mounted on a deflectable support member which is electrically controllable to control the position of the reproducing head.

Another object of the present invention is to provide an apparatus for reproducing a video signal in which a deflectable support member to which the reproducing head is mounted is a bi-morph leaf consisting of piezoceramic material.

A further object of the invention is to provide an apparatus for reproducing a video signal in which the direction of deflection of a bi-morph leaf supporting a reproducing head is skewed with respect to the scanning direction of the head and in which the angle of skew has perpendicular components proportional to the components of tape transport motion during normal scanning in the scanning direction (time base direction) and the cross-track direction (track width direction) to prevent a jumping phenomenon in a displayed picture at head changing.

According to an aspect of the invention, an apparatus is provided for reproducing a video signal recorded in successive skewed tracks on a recording medium which comprises signal reproducing means for reproducing the video signal, rotary means for moving the signal reproducing means along a path generally parallel to the skewed tracks, deflectable means responsive to a control signal for deflecting the signal reproducing means in a single composite direction with respect to the rotary means, the single composite direction having first and second components generally perpendicular and parallel, respectively, to the path of movement of the signal reproducing means, and signal generating means for generating the control signal for application to the deflectable means.

According to a feature of the invention, the single composite direction in which the signal reproducing means are deflected is parallel to a transport direction of the recording medium.

The above, and other objects, features and advantages of the present invention will become apparent from the following description read in conjunction with the accompanying drawings in which like numerals designate the same elements.

BRIEF DESCRIPTION OF THE DRAWINGS

FIG. 2A is a plan view of the support structure for a reproducing head according to an embodiment of the present invention;

FIG. 2B is a side elevation of the support structure shown in FIG. 2A;

FIG. 2C is an end view of the support structure of FIGS. 2A and 2B;

FIG. 3 shows an end view of a bi-morph leaf and a reproducing head according to an embodiment of the invention superimposed on skewed tracks on a section of video tape and showing components of displacement of the head by the bi-morph leaf;

FIG. 4 shows a section of magnetic tape with skewed recorded tracks and reproducing scanning paths represented thereon which will be referred to in describing the manner in which crosstrack and along-track scanning errors due to the use of a tape speed during reproducing which is different from the tape speed used during recording are corrected;

FIGS. 5A and 5B show waveform diagrams to which reference will be made in explaining the manner in which scanning correction is made during still reproduction;

FIGS. 6A and 6B show waveform diagrams to which reference will be made in explaining the manner in which scanning correction is achieved during double speed reproduction; and FIG. 7 shows a block diagram of an apparatus for generating control signals according to an embodiment of the present invention.

DETAILED DESCRIPTION OF THE PREFERRED EMBODIMENT

Figure 1:
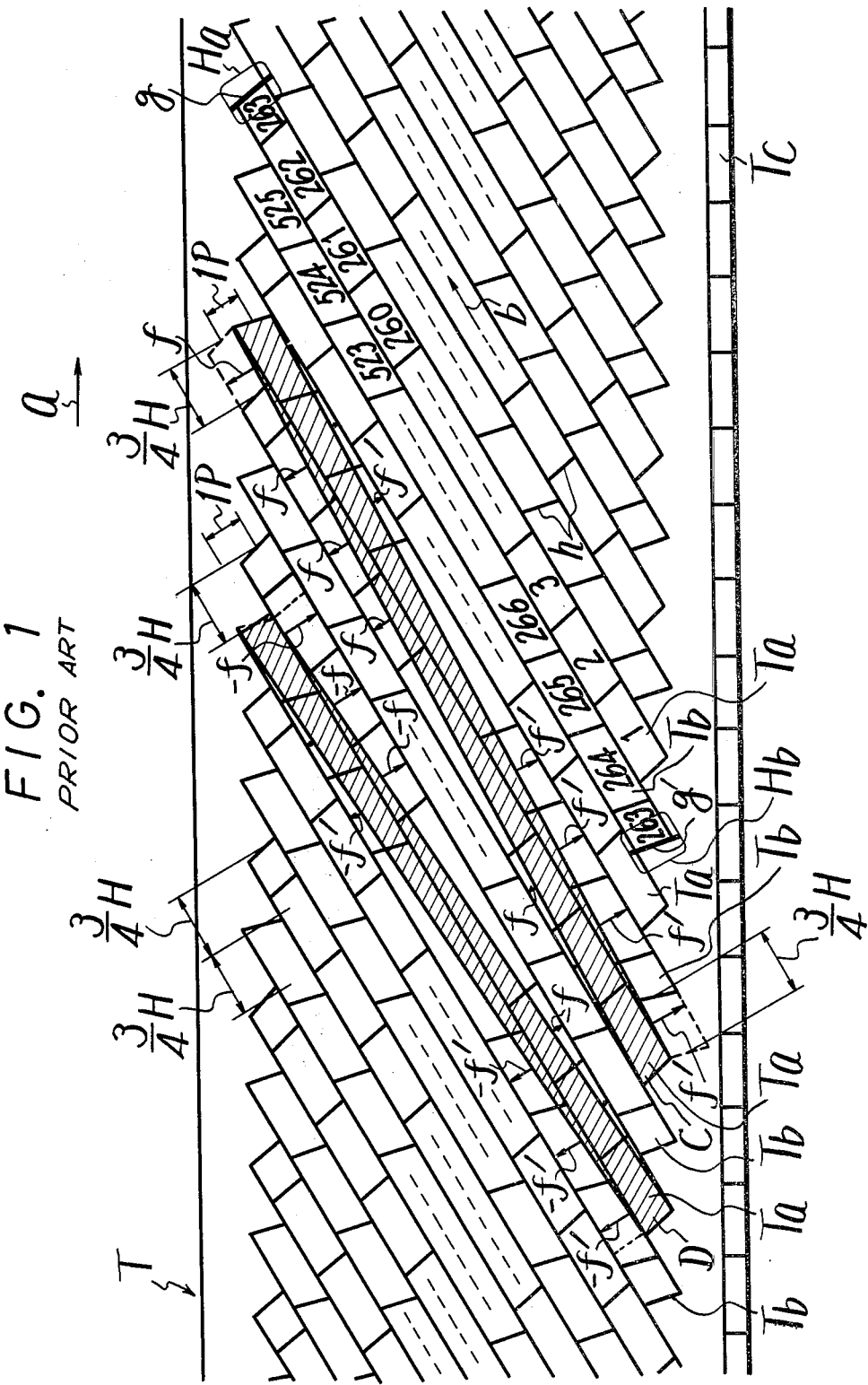
FIG. 1 shows a section of magnetic tape with skewed recorded tracks and reproducing scanning paths represented thereon which will be referred to in explaining the problems in prior art devices.

Referring to FIG. 1, there is illustrated the method employed in the prior art for correcting tracking errors arising from playing back a video tape at a tape transport speed different from that at which it was recorded.

A tape T is transported in the direction shown by an arrow a during recording. Skewed tracks $T_a$ and $T_b$ are recorded side-by-side on tape T by one or more recording heads which are moved along tape T in the direction indicated by an arrow b to form the tracks $T_a$, $T_b$. For purposes of illustration, it is assumed in the following that a reproducing head $H_a$ on a rotating drum (not shown in FIG. 1) is employed to reproduce tracks $T_a$, each of which may contain, for example, an odd field, and a second reproducing head $H_b$ on the rotating drum is employed to reproduce alternate tracks $T_b$, each of which may contain, for example, an even field, between each pair of tracks $T_a$. It is further assumed that the azimuth angles of gaps g and g' of heads $H_a$ and $H_b$ are different for the purpose of avoiding crosstalk while reproducing abutting tracks without guard spaces or bands therebetween and that tracks $T_a$ and $T_b$ have been recorded with corresponding azimuth angles. The azimuth angle of gap g is illustrated as being skewed left and that of gap g' is illustrated as being skewed right. A control track $T_c$ extends along a longitudinal edge of tape T and may contain recorded control signals for identifying the locations of tracks $T_a$ and $T_b$.

Tape T is transported in the direction of arrow a a sufficient distance during recording to space apart the centers of adjacent tracks a pitch distance P measured transverse to the tracks. In addition, the skew angle is such that the distance traveled between tracks in the direction a displaces the ends of the tracks by $\frac{3}{4}$ H (where H is the length of track employed to record one horizontal interval between horizontal synchronizing pulses h). In addition, since the 263rd horizontal interval is recorded half on track $T_a$ and half on track $T_b$, the positions of horizontal synchronizing signals h are displaced $\frac{3}{4}$ H from each other at the ends of the tracks $T_a$ and $T_b$.

If, instead of moving at normal speed in direction a, tape T is stopped while the scanning heads $H_a$ and $H_b$ continue to move at the same rate, the cross-hatched area C defines the path that each of reproducing heads $T_a$ and $T_b$ traces on tape T. As is seen in FIG. 1, the path C begins coincident with a horizontal timing signal h on a track $T_a$ and ends coincident with a horizontal timing h at the end of an adjacent track $T_b$. It will be noted that this skewed track or path is longer by $\frac{3}{4}$ H (represented by the dashed box at the upper extremity of track $T_a$) than track $T_a$. The extra length of scanning path C is due to the absence of an along-track component of motion in the direction a which tended to shorten track $T_a$ during recording. The cross-track skew equal to P is due to the absence of an across-track component of motion in the direction a which displaced track $T_a$ that distance in the across-track direction during recording.

In order to correct the skewed scanning path C in still playback, the prior art applies crosstrack correction displacements f shown as arrows during scanning by head $H_a$ whereby head $H_a$ is made to follow track $T_a$ and then applies displacements f' to force head $H_b$ to follow track $T_b$. Although this solves the problem in the crosstalk direction, it creates an additional problem in the along-track, or time base, direction.

The along-track error which produces an erroneous $\frac{3}{4}$ H of scanning at the trailing end of track $T_a$ and at the leading end of track $T_b$ results in $1\frac{1}{2}$ H of superfluous signal between the end of actual recording on track $T_a$ and the beginning of actual recording on track $T_b$. Thus a period of $1\frac{1}{2}$ H is added to the period H between the last horizontal synchronizing pulse in track $T_a$ and the first horizontal synchronizing pulse in track $T_b$. The presence of the $\frac{1}{2}$ H component disrupts the continuity of horizontal synchronizing pulses and results in skewing of the reproduced picture.

Hatched track D represents the path followed by head $H_a$ when the tape is run at double the normal speed. This produces twice the usual amount of along-track component of displacement due to the motion of tape T and adds an extra skew component in the opposite direction to that encountered in still reproduction. Consequently, track D is approximately $\frac{3}{4}$ H short. In the prior art, correction displacements −f were applied transverse to track $T_a$ to force head $H_a$ to follow track $T_a$ and correction displacements −f' were applied to head $H_b$ to force it to follow track $T_b$. However, as shown, path D is too short by $\frac{3}{4}$ H at the end of track $T_a$ and by $\frac{3}{4}$ H at the beginning of track $T_b$. Consequently, a length of recorded track equal to $1\frac{1}{2}$ H, containing two horizontal sync pulses, is not scanned. As in the still reproduction mode, the presence of the half horizontal interval produces a skew in a reproduced picture.

Turning now to FIGS. 2A–2C, an embodiment of the invention which overcomes the problems discussed in connection with FIG. 1 is described. Specifically, there is described an apparatus which makes it possible in a VTR to reproduce still pictures as well as to reproduce at slow and fast speeds with good signal to noise ratio and no skew.

A bi-morph leaf 61 of any convenient material, but preferably piezo-ceramic, is obliquely attached to a head mounting plate 62 on a rotary magnetic head drum 65 using, for example, an adhesive agent 64. Due to the oblique mounting of the bi-morph leaf 61, the motion thereof due to signals applied to terminals 66 is also oblique to the motion of the surface of the rotary head drum 65 as will be explained.

A head $H_a$ ($H_b$) is attached through a spacer 63 to the bi-morph leaf 61. As is best seen in FIG. 3, head $H_a$ ($H_b$), which has a gap $H_g$ aligned with the required azimuth angle, is moved along vector Q by bi-morph leaf 61. Vector Q has components proportional to component P transverse to the track and component b along the track. Component P and b have the same relationship as P and $\frac{3}{4}$ H on FIG. 1. Under the conditions shown in FIG. 3, the application of a displacement Q by bi-morph leaf 61 displaces the center of gap $H_g$ of head $H_a$ from the position shown centered in track $T_b$ to the tip of the arrow representing vector Q centered in track $T_a$. Thus, while $H_a$ is displaced a distance P in the crosstrack direction it is simultaneously displaced a distance $\frac{3}{4}$ H in the along-track direction.

FIG. 4 shows the manner in which the embodiment of the present invention compensates both for along-track and crosstrack errors when the tape T is moved at a speed different from the speed during recording. Cross hatched path C shows the path followed by head $H_a$ or $H_b$ when the tape is stopped for still reproducing. When head $H_a$ attempts to follow track $T_a$, correction displacements K which are initially zero and increase to a maximum at the end of track $T_a$ are applied to the head by the oblique motion of bi-morph leaf 61 with respect to path C. This displaces the head a total crosstrack displacement P by the time it reaches the end of track $T_a$ and also shortens the travel path by an amount $\frac{3}{4}$ H whereby the path of head $H_a$ is made to correspond both in direction and in length with the track $T_a$. Similarly, following the scanning track $T_a$, correction displacements l are applied which start at a maximum value having a crosstrack component equal to P and an along-track component equal to $\frac{3}{4}$ H. This causes the scanning of track $T_b$ by head $H_b$ to begin at P' coincident with the beginning of track $T_b$. The correction displacement l decreases along track $T_b$ to zero at its end. This causes the scanning of head $H_b$ to correspond in direction and length with track $T_b$.

The deflection voltages or signals which are applied to the leaves 61 supporting heads $H_a$ and $H_b$ during scanning while tape T is stopped as shown in FIGS. 5A and 5B, respectively. Signal $H_{av}$, which is initially zero, increases linearly to a value e corresponding to the linear increase in correction displacement K (FIG. 4). After reaching a value e, $H_{av}$ falls to zero. Coincident with signal $H_{av}$ falling to zero, a voltage $H_{bv}$ (FIG. 5B) rapidly increases in the negative direction to −e then increases linearly corresponding to the correction displacement l (FIG. 4).

Returning to FIG. 4 it will be seen that crosshatched path D, which results from operating the tape T at twice the recording speed in the direction a, is corrected to follow tracks $T_a$ and $T_b$ by correction displacements m and n which simultaneously correct the crosstrack error a distance P and increase the along-track travel distance an amount $\frac{3}{4}$ H.

The signals applied to leaves 61 supporting heads $H_a$ and heads $H_b$ to produce correction displacements m and n are shown respectively in FIGS. 6A and 6B. Signal $H_{a'v}$ (FIG. 6A) which begins at zero and decreases linearly to −e then rapidly rises to zero, is applied to leaves 61 supporting head $H_a$. Signal $H_{b'v}$ (FIG.

6B), which rapidly rises from zero to e coincident with the rapid rise of signal $H_{a'v}$ and then linearly decreases to zero, is applied to leaves 61 supporting head $H_b$.

The apparatus shown in FIG. 7 may be employed to produce the control signals shown in FIGS. 5A, 5B, 6A and 6B for providing the corrections required for still and double speed tape motion as well as for other speeds. A frequency generator 31 produces a signal which has a frequency related to the tape transport speed. Frequency generator 31 may conveniently be connected to a capstan motor (not shown) in order to receive a mechanical input proportional to tape transport speed. The variable frequency signal from frequency generator 31 is applied to an input of a frequency discriminator 32. An output of frequency discriminator 32 is applied to an input of a sawtooth signal generator 33. A control head 34 reproduces the control signals recorded on control track $T_c$ (FIGS. 1 and 4) and which are applied to one input of sawtooth generator 33. Another head 36 reproduces a signal which is related to the rotational position of heads $H_a$ and $H_b$ and which is fed to another input of sawtooth generator 33. Head 36 may, for example, be exposed to the influence of a magnet (not shown) attached to rotary head drum 65 (FIG. 2) and which has a known positional relationship to heads $H_a$ and $H_b$. The outputs of control head 34 and head 36 may control the start and stop times of the control signals shown in FIGS. 5A, 5B, 6A and 6B and which are generated by sawtooth signal generator 33. The output of frequency discriminator 32 determines the direction and slope of the generated sawtooth signal. The sawtooth signal from sawtooth signal generator 33 is amplified in a drive amplifier 35 and applied to bi-morph leaf 61 mounting head $H_a$ or $H_b$. Thus, depending upon the frequency generated by frequency generator 31 and the timing signals generated by control head 34 and head 36, the appropriate correction signals are applied to bi-morph leaf 61 to produce accurate tracking during still, slow, fast or double speed reproduction without the appearance of skew on the reproduced picture.

Since the bi-morph leaf 61 is fixed to rotary drum 65, the along-track displacement of the head viewed from the tape side changes in response to variations in gradient in this direction. In fact, however, this causes no practical problems since such gradient variations of bi-morph leaves are very small.

Rather than employ heads $H_a$ and $H_b$ to achieve still reproduction, a second head having the same azimuth angle as, for example, head $H_a$, may be added to the rotary drum 65. Thus, track $T_a$ may, for example, be repetitively scanned on every field to achieve still reproduction.

Having described a specific embodiment of the invention with reference to the accompanying drawings, it is to be understood that the invention is not limited to this precise embodiment, and that various changes and modifications may be effected therein by one skilled in the art without departing from the scope or spirit of the invention as defined in the appended claims.

What is claimed is:

1. An apparatus for reproducing a video signal recorded in successive skewed tracks on a recording medium comprising: signal reproducing means for reproducing said video signal; rotary means for moving said signal reproducing means along a path generally parallel to said skewed tracks; deflectable support means responsive to a control signal for deflecting said signal reproducing means in a single composite direction with respect to said rotary means; means for mounting said deflectable support means on said rotary means at a predetermined non-perpendicular angle relative to said path along which said signal reproducing means is moved, such that said single composite direction is at a first angle relative to the perpendicular direction of said path and at a second angle relative to the longitudinal direction of said path so as to have a first component of deflection generally perpendicular to said path and a second component of deflection generally parallel to said path; and signal generating means for generating said control signal for application to said deflectable support means.

2. An apparatus for reproducing a video signal according to claim 1, wherein said recorded video signal results from said recording medium being transported at normal speed in a transport direction during recording and said composite direction is substantially parallel to said transport direction.

3. An apparatus for reproducing a video signal according to claim 2, wherein when said recording medium is transported at other than normal speed during reproduction, the length of said path along which said reproducing means is moved differs from the length of the track being scanned thereby and said path is transversely displaced from said track in the absence of a control signal applied to said deflectable support means, and wherein said predetermined angle is such that the ratio of said first component of deflection to said second component of deflection is substantially equal to the ratio of transverse displacement of said path from said track to the difference in length between said path and track.

4. An apparatus for reproducing a video signal according to claim 1, wherein said successive skewed tracks are adjacent each other without guardbands therebetween.

5. An apparatus for reproducing a video signal according to claim 1, wherein said deflectable support means includes piezo-ceramic material.

6. An apparatus for reproducing a video signal according to claim 5, wherein said piezo-ceramic material includes a bi-morph leaf operative to deflect said signal reproducing means both positively and negatively along said single composite direction.

7. An apparatus for reproducing a video signal according to claim 1, wherein said signal reproducing means includes first and second reproducing heads alternately reproducing said video signal from successive skewed tracks.

8. An apparatus for reproducing a video signal according to claim 7, wherein said first and second reproducing heads are first and second magnetic heads having first and second air gaps respectively.

9. An apparatus for reproducing a video signal according to claim 8, wherein said first and second air gaps have different azimuth angles.

10. An apparatus for reproducing a video signal according to claim 1, wherein said signal generating means includes speed sensing means for sensing a speed of said recording medium during reproduction, sawtooth generating means responsive to an output of said speed sensing means for controlling a slope of said control signal, and sensing means for synchronizing said control signal with information recorded on said recording medium and with an angular position of said signal reproducing means.

11. An apparatus for reproducing video signals recorded in parallel tracks on a recording medium which are skewed with respect to a transport direction of said recording medium, said recorded video signals including horizontal synchronizing signals which are recorded in a predetermined offset relationship in adjacent parallel tracks, comprising: first and second signal reproducing heads; rotary means for moving said first and second signal reproducing heads along first and second paths generally parallel to said parallel tracks; first and second deflectable support means responsive to first and second control signals for deflecting each of said first and second signal reproducing heads, respectively, in a single composite direction with respect to said rotary means; first and second mounting means for mounting said first and second deflectable support means, respectively, on said rotary means at respective predetermined non-perpendicular angles relative to said paths along which said signal reproducing heads are moved, such that said single composite direction is at a first angle relative to the perpendicular direction of said paths and at a second angle relative to the longitudinal directions of said paths so as to have a first component of deflection generally perpendicular to said path of the respective head and a second component of deflection generally parallel to said respective path; and tracking signal generating means for generating said first and second control signals, said first and second control signals being operative to produce composite deflections of said first and second signal reproducing heads which compensate for head displacement errors due to a speed of transport of the recording medium in said transport direction during reproduction being different from a speed in said transport direction during recording.

* * * * *